United States Patent
Peters et al.

(10) Patent No.: US 10,734,793 B2
(45) Date of Patent: Aug. 4, 2020

(54) SYSTEM AND METHOD FOR LAYING UNDERGROUND CABLES OR UNDERGROUND LINES IN THE GROUND NEAR THE SURFACE

(71) Applicant: HERRENKNECHT AG, Schwanau (DE)

(72) Inventors: Marc Peters, Freiburg (DE); Tobias Engel, Gundelfingen (DE); Tobias Gerhardt, Teningen (DE); Steffen Praetorius, Schwanau (DE)

(73) Assignee: Herrenknecht AG, Schwanau (DE)

( * ) Notice: Subject to any disclaimer, the term of this patent is extended or adjusted under 35 U.S.C. 154(b) by 0 days.

(21) Appl. No.: 15/574,460

(22) PCT Filed: May 27, 2016

(86) PCT No.: PCT/EP2016/000877
§ 371 (c)(1),
(2) Date: Nov. 15, 2017

(87) PCT Pub. No.: WO2016/192844
PCT Pub. Date: Dec. 8, 2016

(65) Prior Publication Data
US 2018/0269664 A1 Sep. 20, 2018

(30) Foreign Application Priority Data

May 29, 2015 (DE) .................. 10 2015 108 576

(51) Int. Cl.
*E21B 7/04* (2006.01)
*H02G 1/08* (2006.01)
(Continued)

(52) U.S. Cl.
CPC ................. *H02G 1/08* (2013.01); *E21B 7/04* (2013.01); *E21B 7/046* (2013.01); *E21B 7/128* (2013.01);
(Continued)

(58) Field of Classification Search
CPC ...................................... E21B 7/046
See application file for complete search history.

(56) References Cited

U.S. PATENT DOCUMENTS 4,221,503 A 9/1980 Cherrington
4,399,877 A * 8/1983 Jackson .................. E21B 7/046
166/65.1

(Continued)

FOREIGN PATENT DOCUMENTS

| DE | 4142343 C2 | 10/1996 |
| DE | 102012217822 | * 4/2014 |
| DE | 102013111350 A1 | 4/2015 |
| SU | 1701903 A1 | 12/1991 |

*Primary Examiner* — Sean D Andrish
(74) *Attorney, Agent, or Firm* — Mark Rodgers

(57) ABSTRACT

The invention relates to a system for laying underground cables or underground lines in the ground near the surface, in a borehole (102) along a laying route (101) between a start point (100) and a target point (110), comprising a boring device (10) comprising an advancing head (12) for creating the borehole (102), a drilling rod (11) and/or a casing (14), wherein the diameter of the advancing head (12) is greater than the diameter of the casing (14) or of the drilling rod (11), so that an annular space (121) is formed between the borehole wall (102) and the casing (14) or the drilling rod (11) and the annular space (121) is provided with lubrication and wherein the advancing head (12) relates to a displacement drilling head (15, 16, 41) or a drilling head system (18) comprising a drilling tool (19) and a drilling tool drive (22) for loosening the ground.

10 Claims, 18 Drawing Sheets

Figure 5:
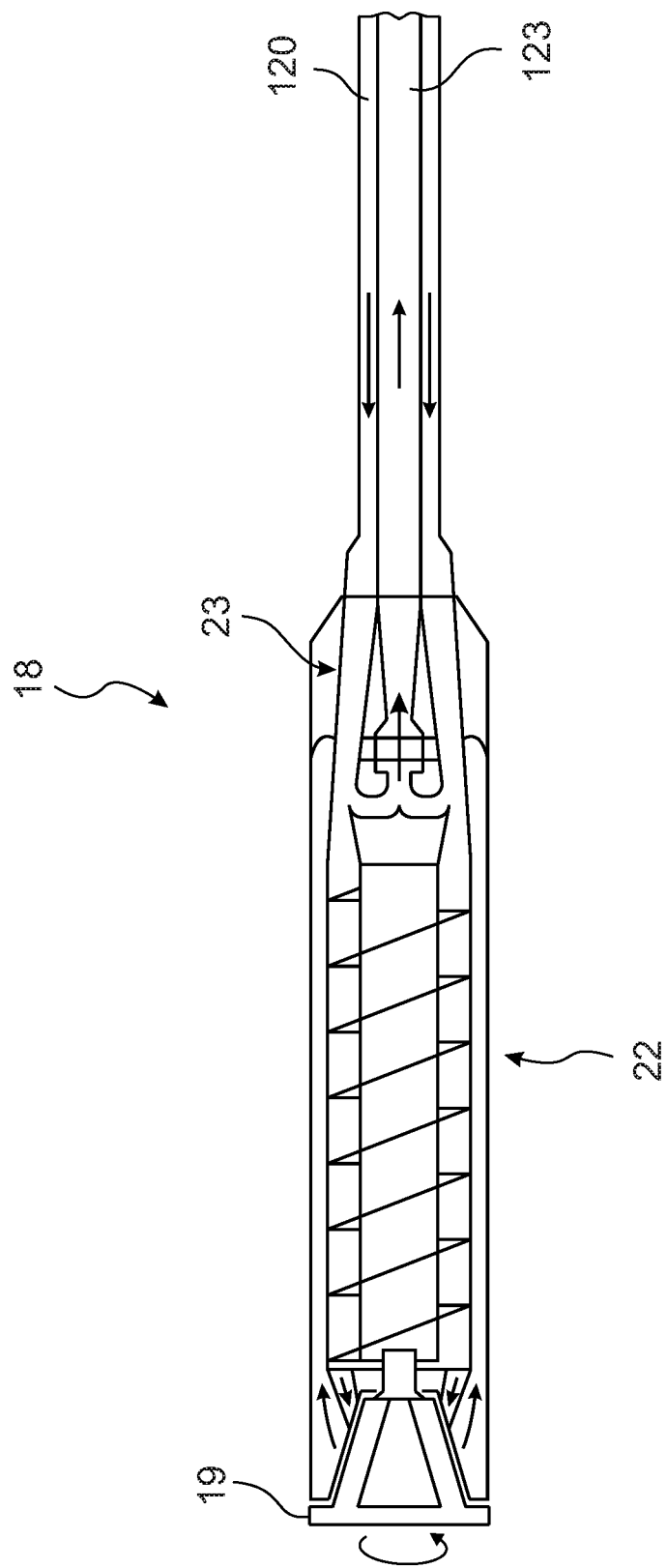

(51) Int. Cl.
  *E21B 7/20* (2006.01)
  *E21B 7/128* (2006.01)
  *H02G 9/02* (2006.01)
  *H02G 1/06* (2006.01)
  *E21B 21/08* (2006.01)
  *H02G 9/06* (2006.01)

(52) U.S. Cl.
  CPC .............. *E21B 7/203* (2013.01); *E21B 21/08* (2013.01); *H02G 1/06* (2013.01); *H02G 9/02* (2013.01); *H02G 9/06* (2013.01)

(56) References Cited

U.S. PATENT DOCUMENTS

| | | | | |
|---|---|---|---|---|
| 4,784,230 | A | * | 11/1988 | Cherrington .............. E21B 7/04 175/113 |
| 5,339,909 | A | | 8/1994 | Jenne |
| 7,152,700 | B2 | * | 12/2006 | Church .................. E21B 7/068 175/320 |
| 7,731,453 | B2 | | 6/2010 | Stein |
| 2003/0066684 | A1 | * | 4/2003 | Klemm ..................... E21B 4/14 175/19 |
| 2007/0187148 | A1 | * | 8/2007 | Self ........................ E21B 7/046 175/53 |
| 2011/0005838 | A1 | * | 1/2011 | Granberg ................. E21B 4/14 175/61 |
| 2011/0137618 | A1 | * | 6/2011 | Fluharty, II ............. E21B 7/046 703/1 |

* cited by examiner

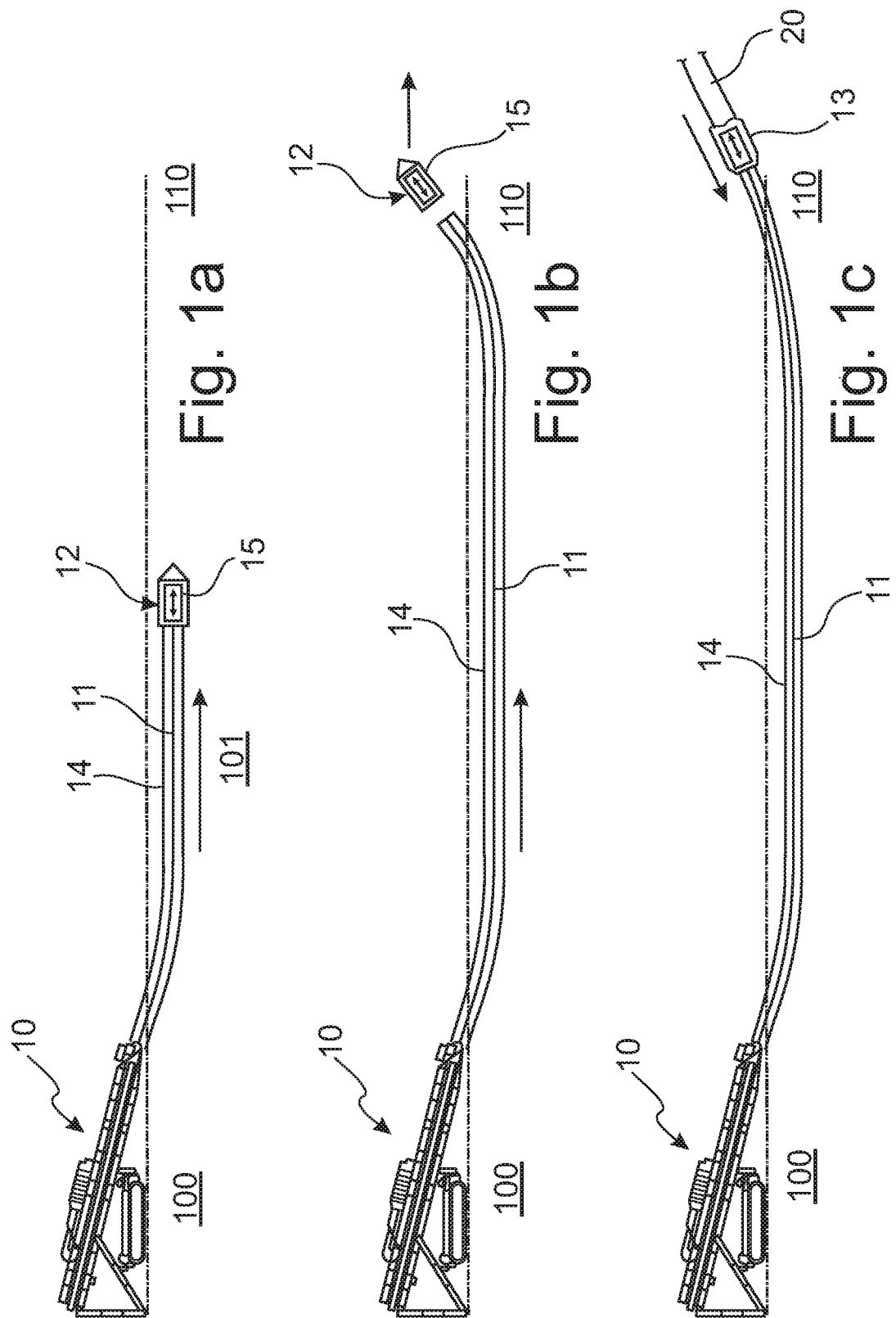

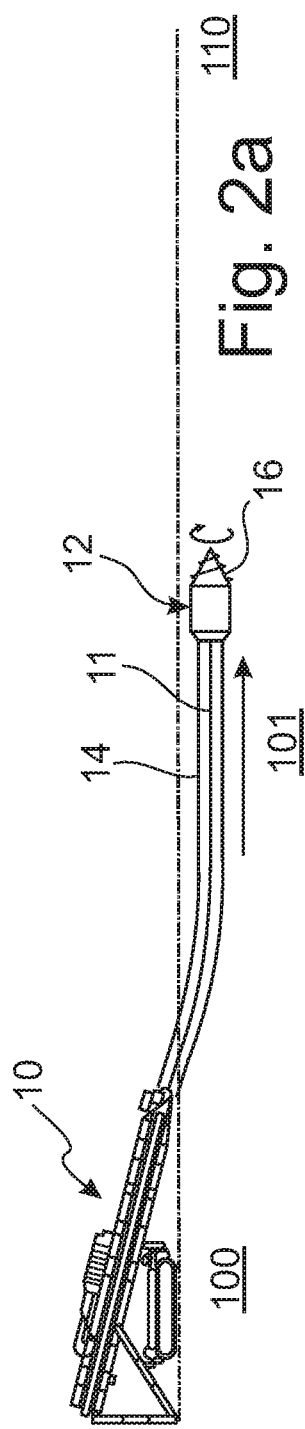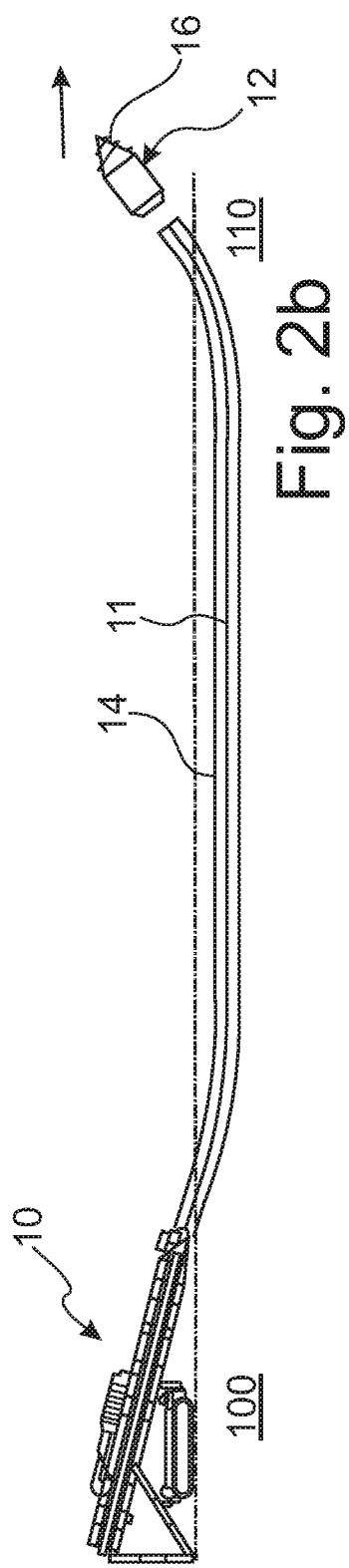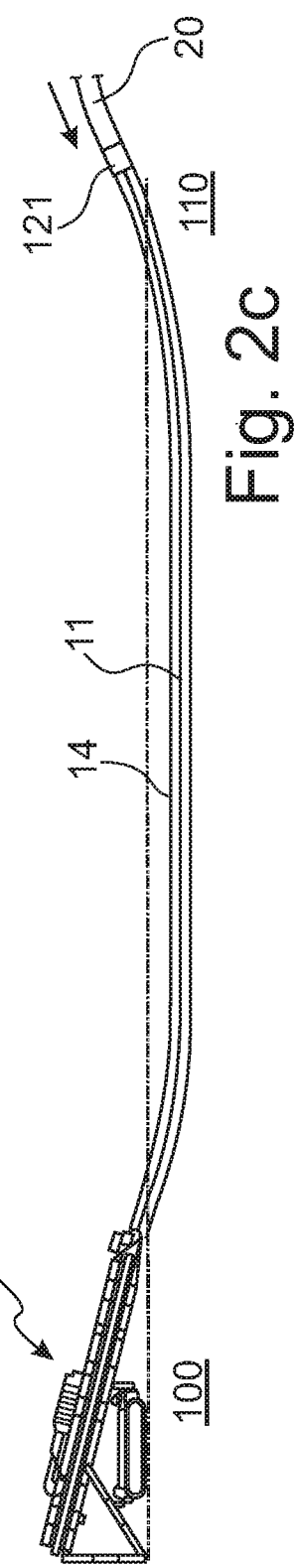

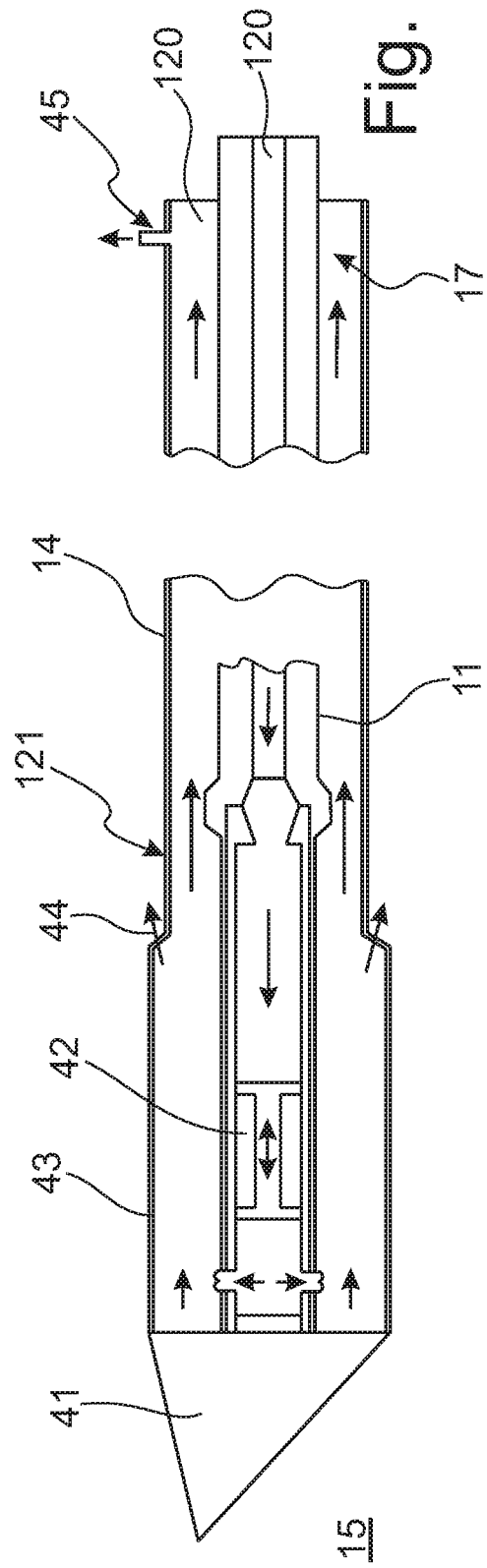
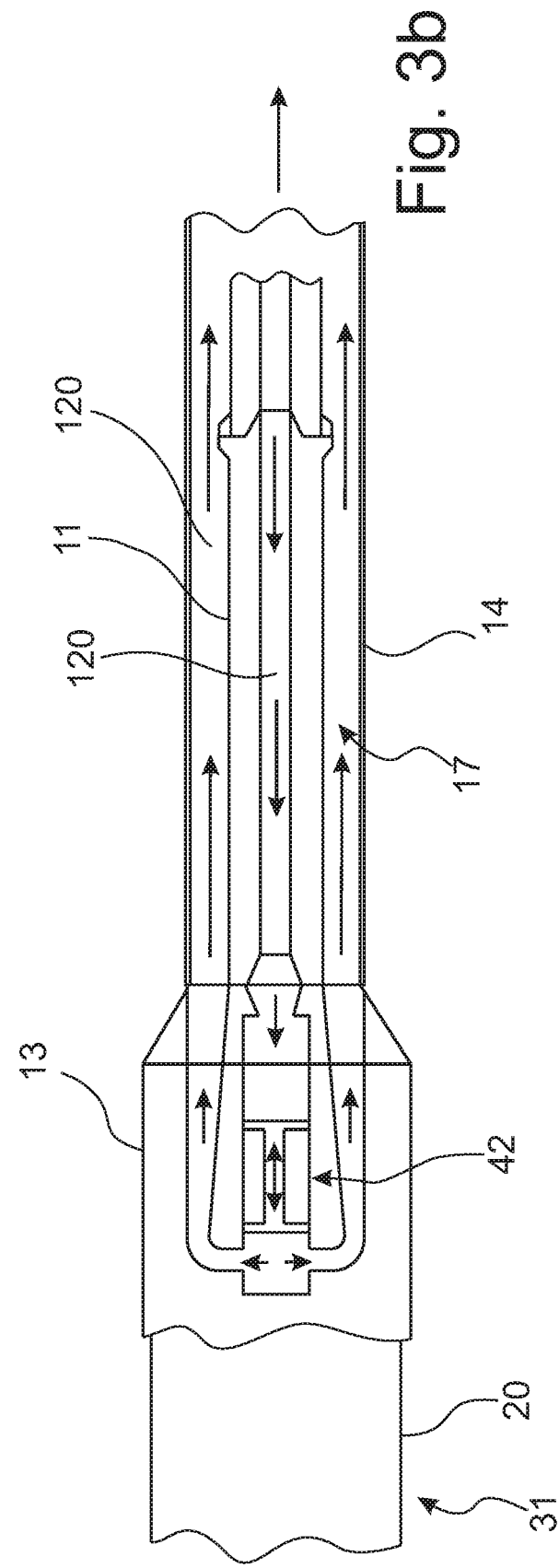
Fig. 3a
Fig. 3b

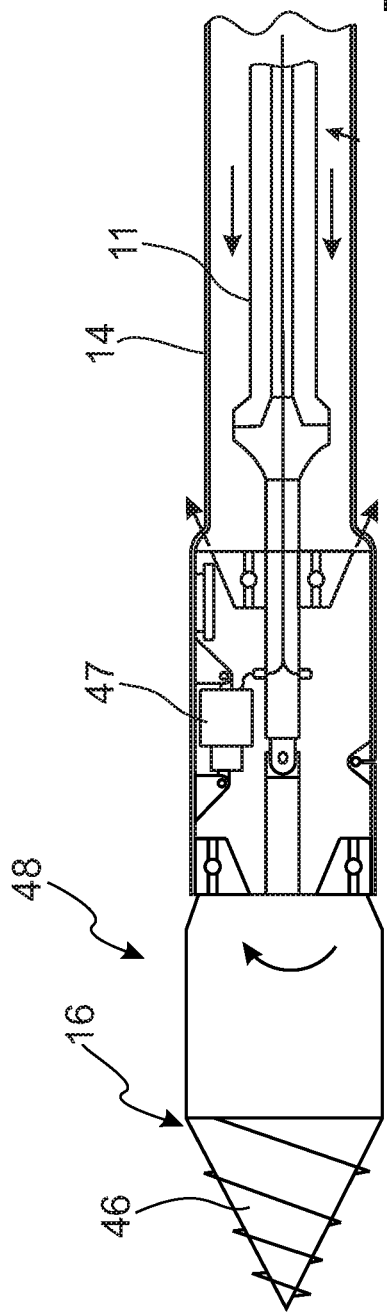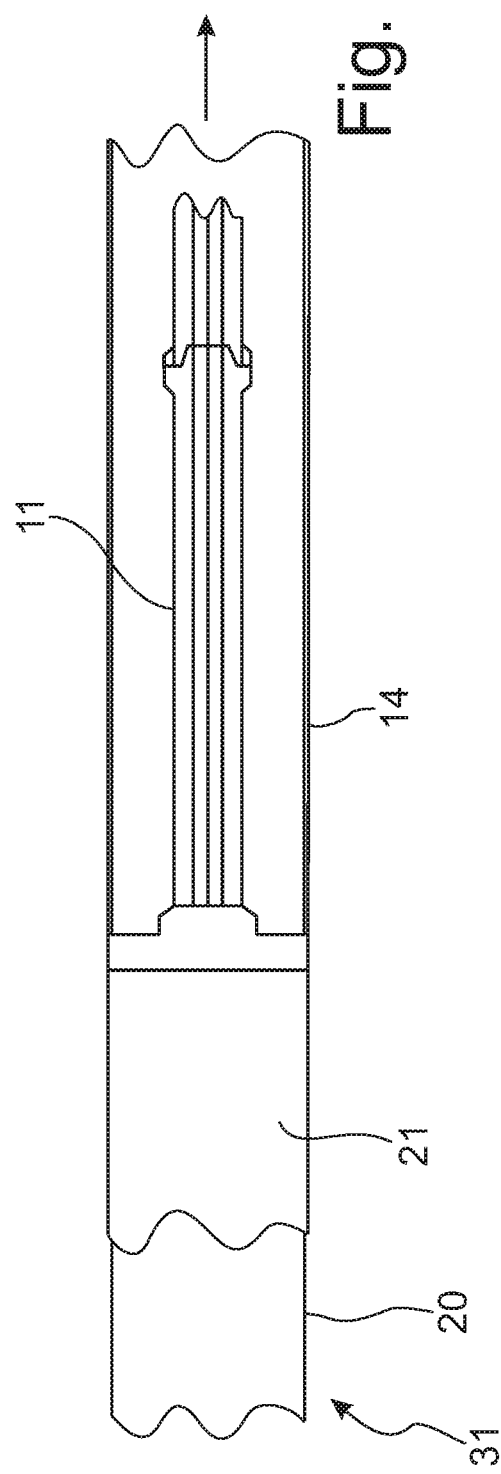

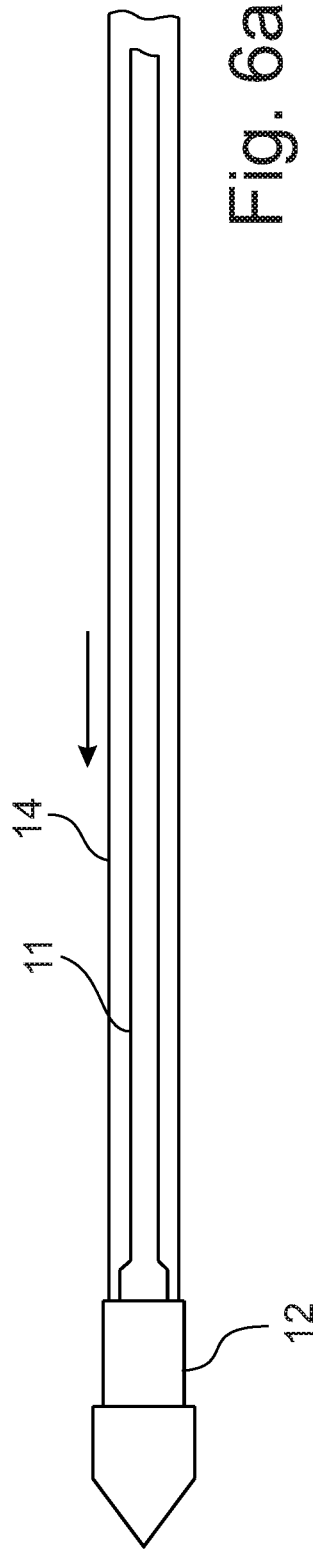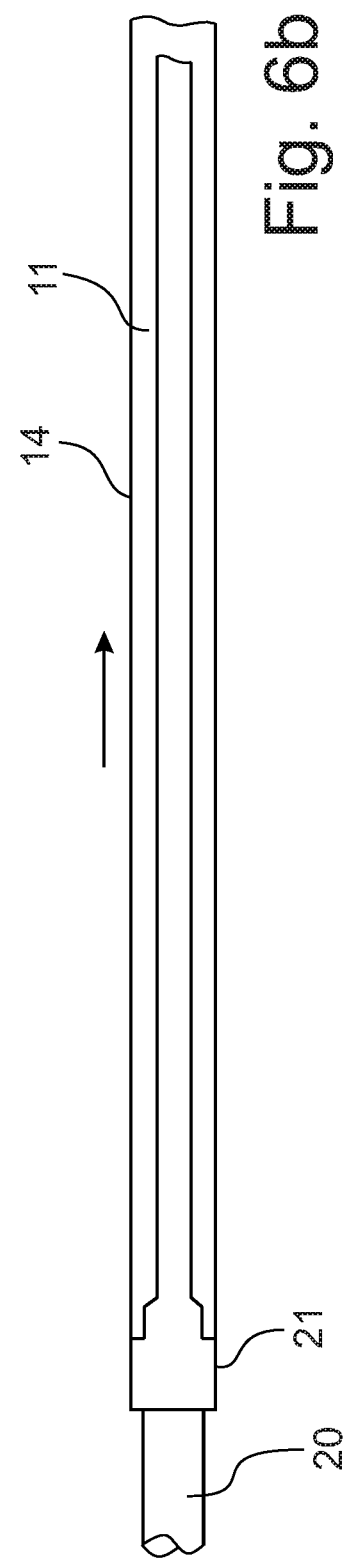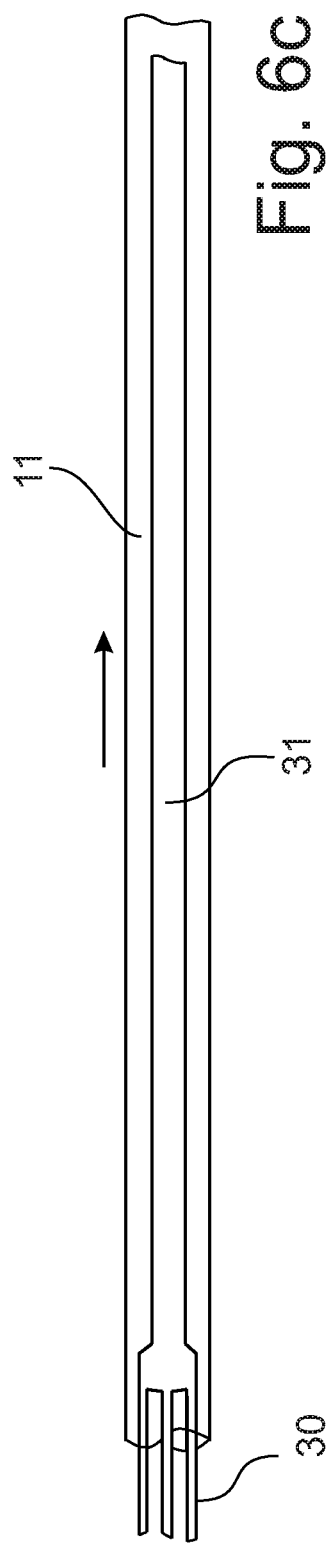

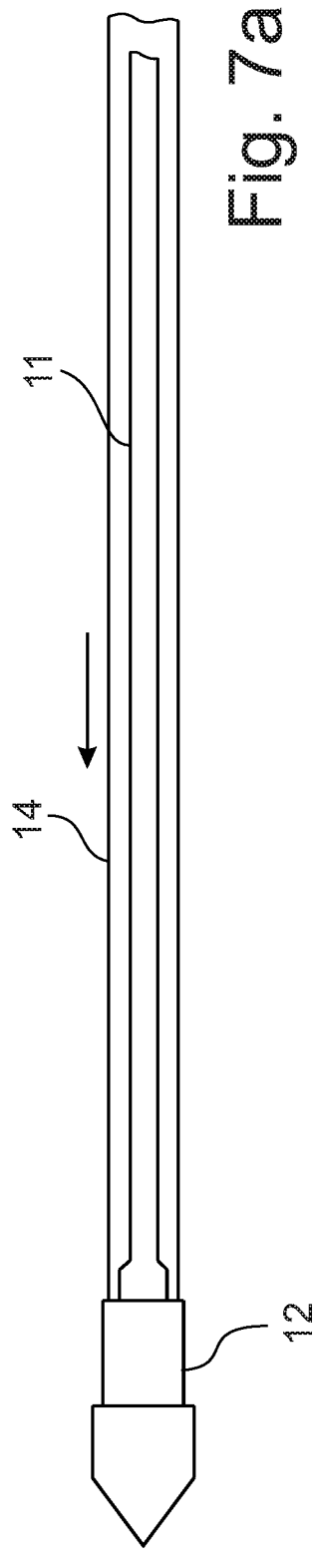
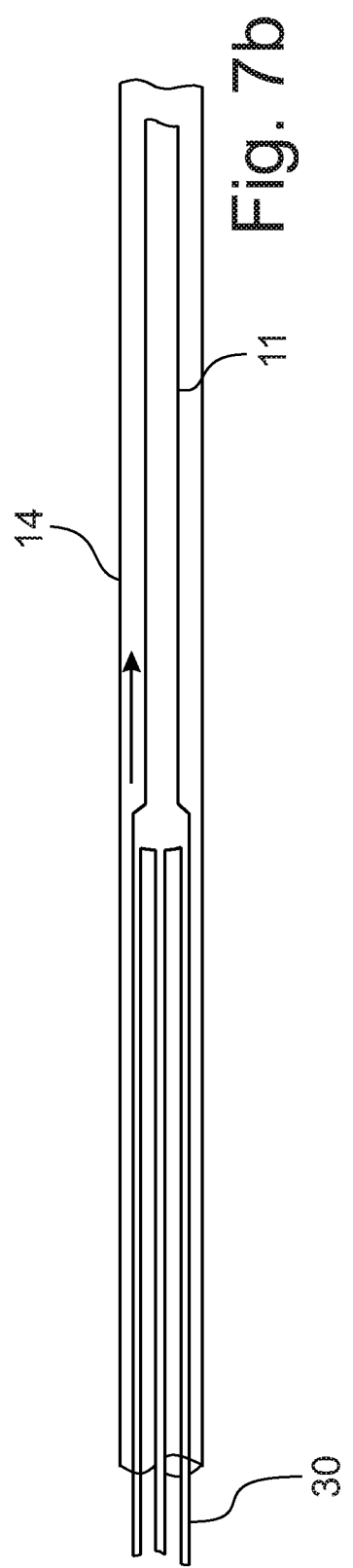
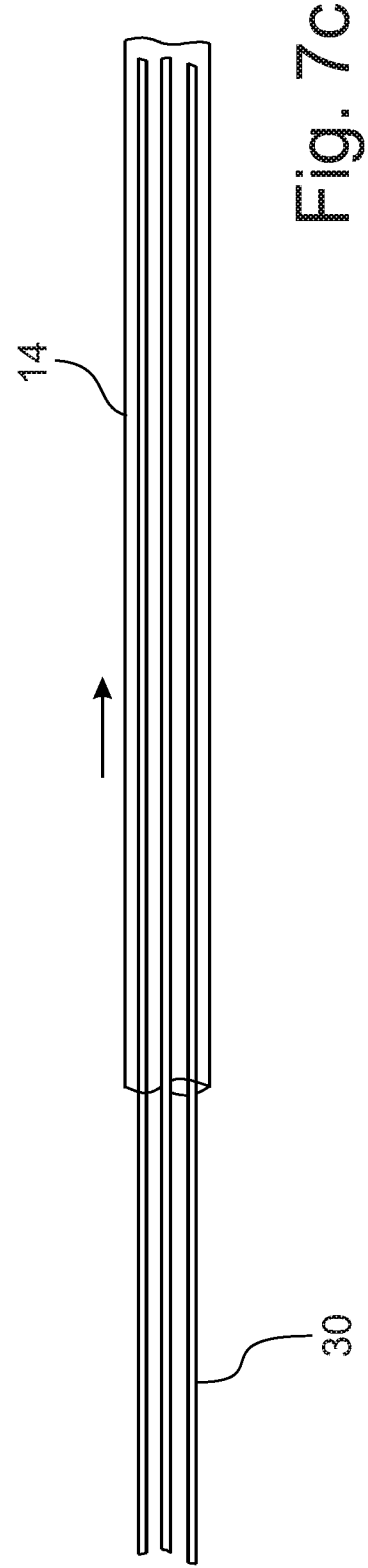

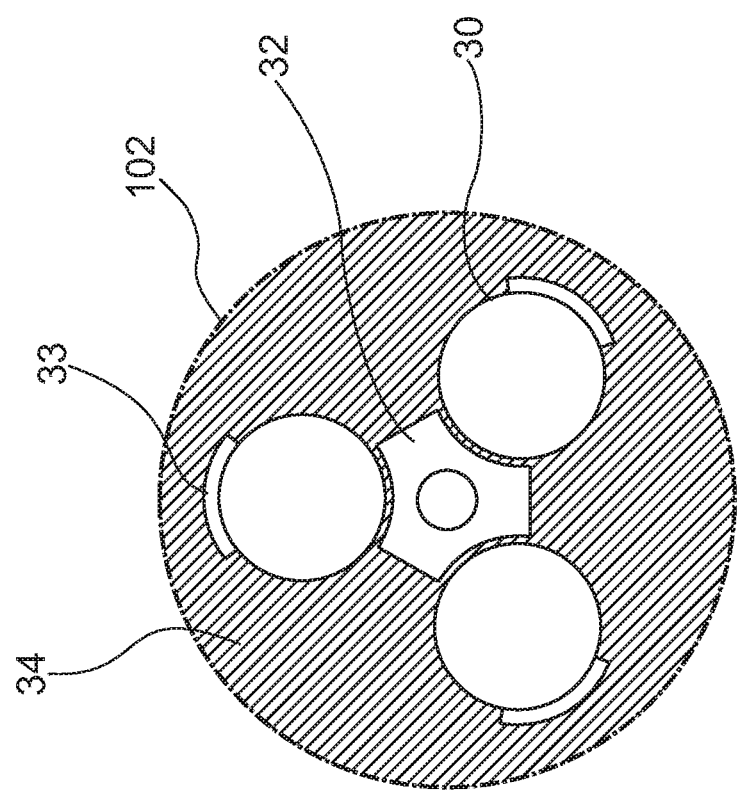

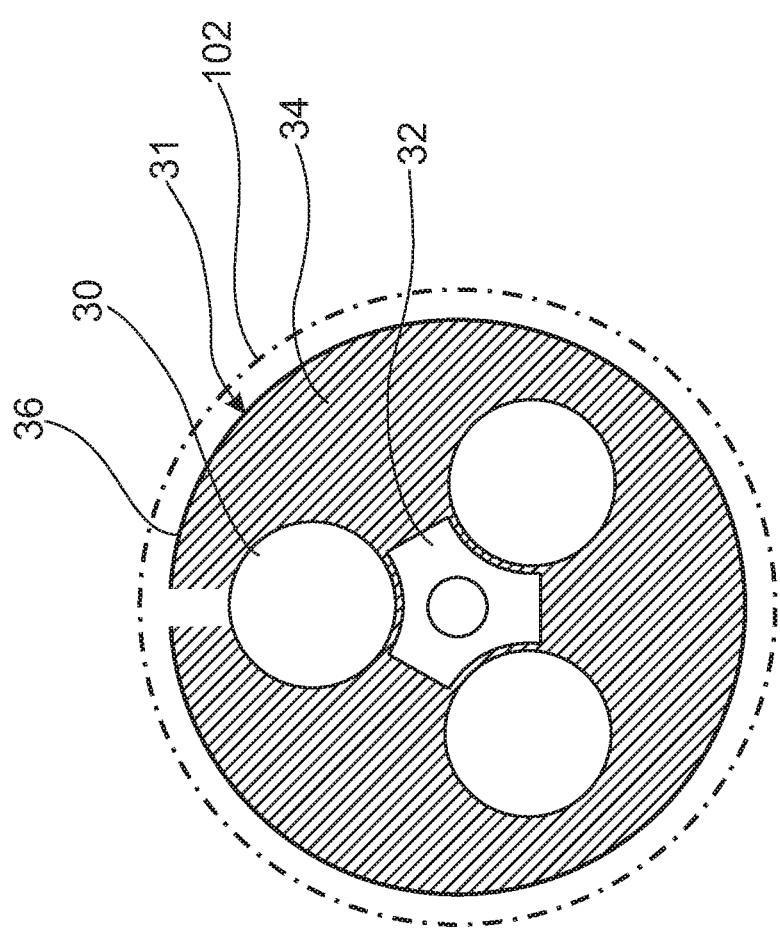

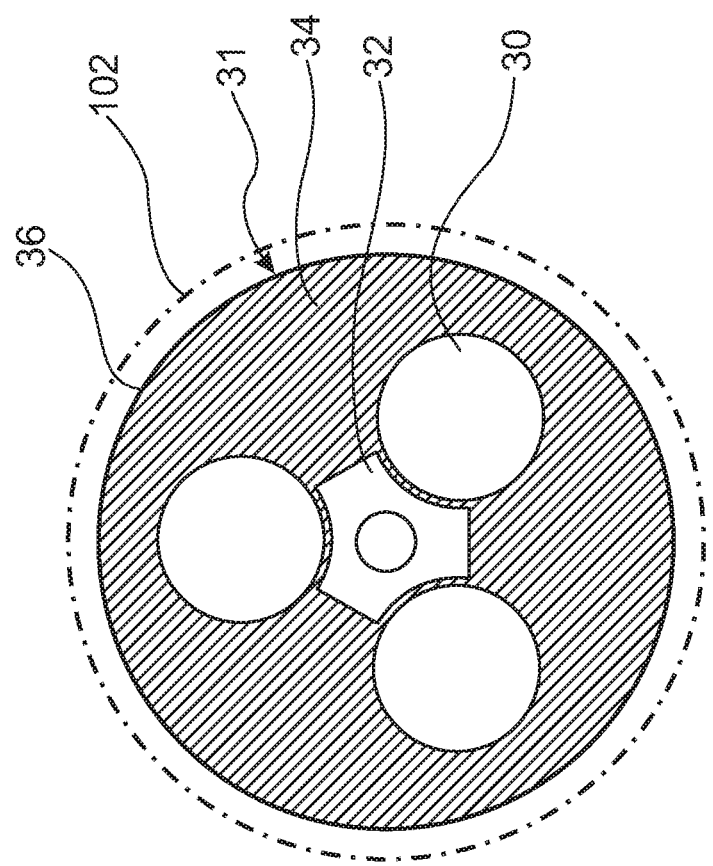

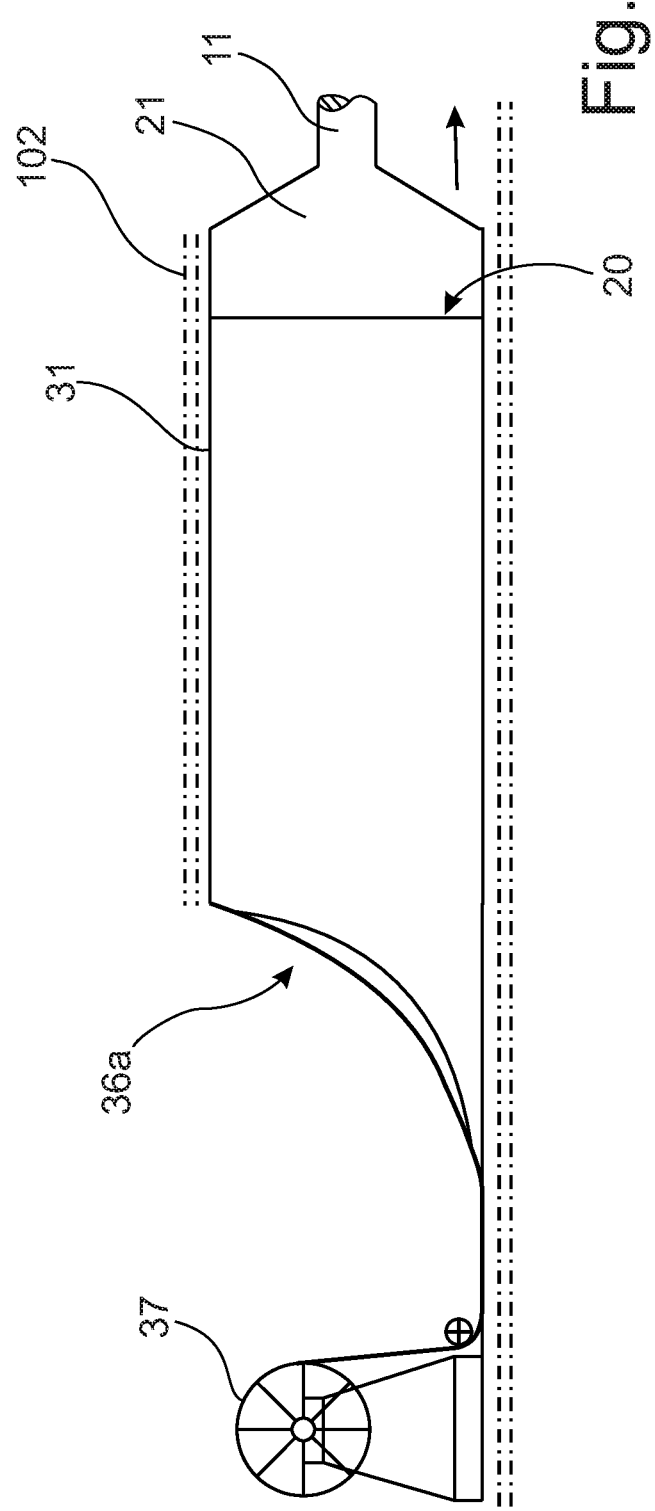

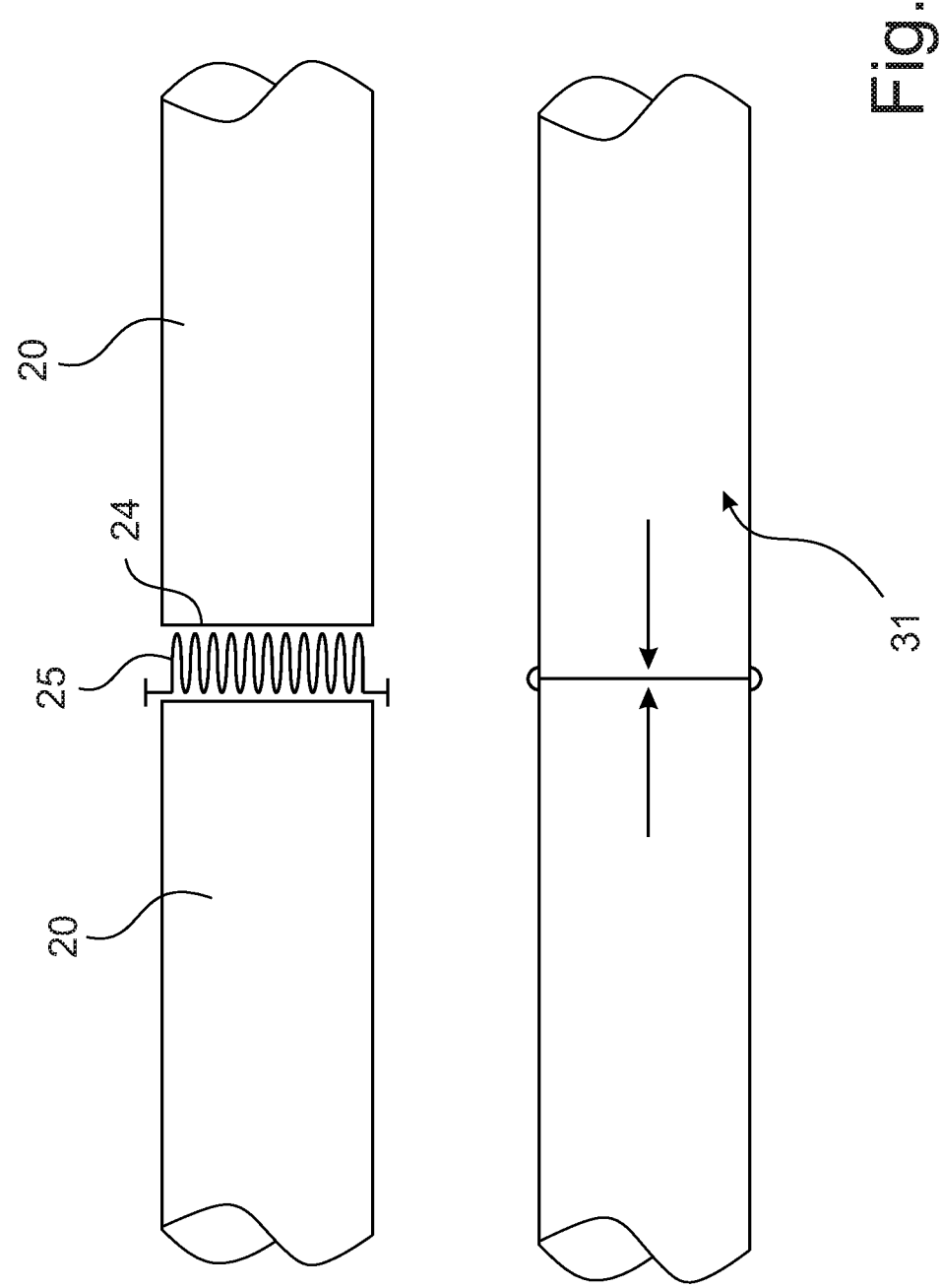

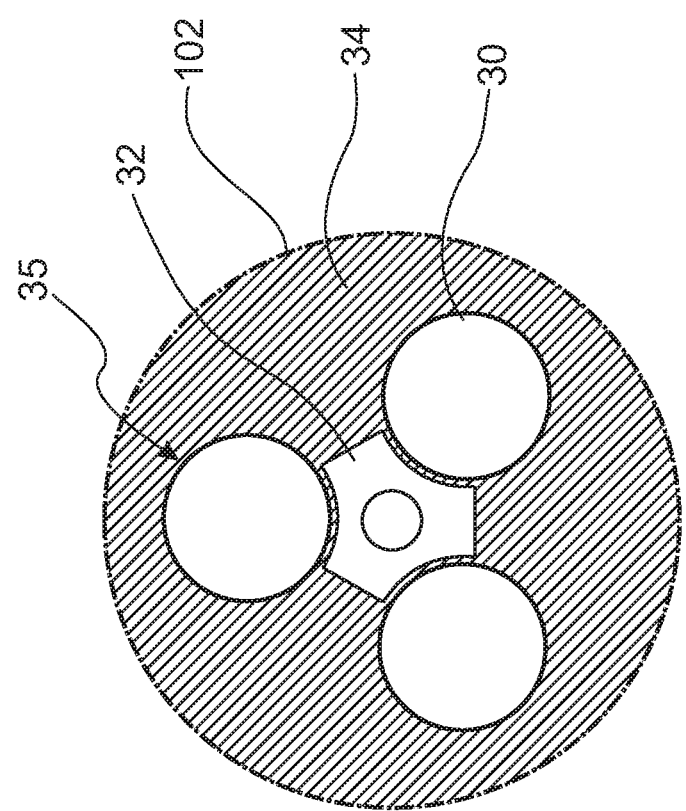

SYSTEM AND METHOD FOR LAYING UNDERGROUND CABLES OR UNDERGROUND LINES IN THE GROUND NEAR THE SURFACE

The invention relates to a system for laying underground cables or underground lines in the ground near the surface, the cables or lines being laid in a borehole along a laying route between a starting point and a target point, having a drilling apparatus with an advancement head for creating the borehole, and with drill piping and/or a casing, and to a method for laying underground cables or underground lines in the ground near the surface, the cables or lines being laid in a borehole along a laying route between a starting point and a target point, in the case of which an advancement head is moved along the laying route by a drilling apparatus transmitting a feed motion or a feed motion and a rotation via drill piping.

For constructing a power-supply system, for example for creating a 380 kV line, it is necessary not just to create power lines, but also to lay these lines in the ground.

In the case of underground cables being laid near the surface, use is made of open-trench excavation. This gives rise, in some cases, to considerable environmental interference along the route and is associated with not insignificant outlay for the excavation of trenches and the refilling of the same. In order to create a 380-kV-cable route, it is necessary to create, for example, two trench profiles each with a width of 5.5 m and a depth of 2.15 m. The operation of separating the individual layers of soil has proven to involve particular outlay, as it renders a number of separate heaps necessary. This is needed so that, when the trench is subsequently refilled, the soil quality is restored to the original state. Furthermore, during construction work, a surface area of approximately 40 m has to be kept clear for construction purposes, whereas, following completion of the construction work, a cable-protection strip of approximately 23 m has to be kept accessible. These very high-outlay interventions during construction, and resulting effects following completion of the work involved with open-trench laying, make it necessary to develop an appropriate underground laying method.

In order also to keep the interference with nature during construction and the construction costs to a low level it is necessary to achieve long lengths between supports for trenchless laying. Lengths of up to 1500 m are the target here. A problem with laying near the surface is that the line has a small overburden (for example merely 2 to 6 m). The diameter of the lines to be laid here is less than 800 mm, in some cases even less than 300 mm.

There are already trenchless drilling methods available from pipeline construction (microtunneling and HDD drilling). However, it is not possible for these methods to cover the necessary parameters.

There are therefore drilling methods in existence which make it possible to lay the desired diameter range, but these methods, for technical reasons, are limited to significantly shorter route lengths. These methods include, for example, microtunnel drilling up to 300 mm. For a length of up to more than 1.5 km, it would also currently be necessary to make use of microtunnel drilling with a diameter of approximately 1000 mm. However, the amount of space required by the construction-site equipment and also the costs increase significantly as the diameter increases. It is therefore not possible to use microtunnel drilling.

The Horizontal Directional Drilling (HDD) method would be a conceivable laying method to use in order to meet the requirements relating to diameter and route length. This method is already used specifically for passing beneath rivers or roads. In this method, first of all a pilot hole is created from the starting point in the direction of the target point using a rotating drilling head and drill piping. The positional accuracy is ensured here by a measuring system fitted behind the drilling head. The material removed is brought to the surface by a bentonite suspension. The bentonite suspension is pumped through the drill piping directly to the nozzles fitted on the drilling head. The suspension mixes with the loosened soil and flows back to the starting point through the annular space between the drill piping and soil. For good delivery of loosened soil, however, high mud pressures are necessary. However, in order to prevent mud from exiting in an undesirable manner at the surface, as large as possible laying depths and therefore overburdens for example of more than 30 m are necessary here in the case of the HDD method. With certain types of soil laying depths of less than 10 m can result in mud exiting in an undesirable manner in the case of the conventional HDD method.

It is an object of the invention to provide a system and a method which are intended for laying underground cables or underground lines in the ground near the surface and by means of which the above described disadvantages can be overcome and it is possible for underground cables or underground lines to be laid near the surface with lengths between supports of up to 1500 m.

As far as the system is concerned, the object according to the invention is achieved by a first solution according to the invention, in that the diameter of the advancement head is larger than the diameter of the casing or of the drill piping, and this results in an annular space between the borehole wall and casing or drill piping, in that the annular space is provided with a lubrication, and in that the advancement head is a drilling-head system made up of a drilling tool and drilling-tool drive for loosening the soil.

The essential advantage of the system is that, in comparison with the known laying methods, the amount of surface area required by the construction-site equipment is relatively small. Interference with the landscape is necessary only at certain points: at the starting point and target point. The limited capability of transporting the cable in one piece makes it necessary to construct a coupling or junction-box assembly at the starting point and target point, and this further reduces the amount of intervention or interference. Furthermore, there is no need for the environment to suffer from any structural interference along the route, and this makes it possible for underground cables to be laid in a particularly environmentally compatible manner. For example, the use of heavy machinery between the starting point and target point is dispensed with. There is no alteration to soil layers precisely in respect of agricultural use, and therefore, following completion of the work, planting and growth can continue unaltered. In contrast to overhead-line construction, underground laying does not result in the appearance of the landscape being adversely affected. At the same time, the small overburden means that lines requiring servicing are quick to reach.

As far as the system is concerned, the object according to the invention is achieved by a further solution according to the invention, in that the diameter of the advancement head is larger than the diameter of the casing or of the drill piping, and this results in an annular space between the borehole wall and casing or drill piping, in that the annular space is provided with a lubrication, and in that the advancement head is a displacement drilling head. The aforementioned advantages also apply here.

A further solution of the invention provides for the displacement drilling head to be a hammer drill or a soil-displacement screw. It is also advantageous for the displacement drilling head (15, 16, 41) to have a drilling-tool drive. Displacement-action introduction reliably avoids drilling mud being blown out at the surface and the associated harm to the environment.

A further solution of the invention provides for the drilling-tool drive to be an electric motor or a mud motor. This reliably and straightforwardly provides for a drilling head to be driven without rotation of the drill piping. Furthermore, the mud motor can be operated particularly straightforwardly and reliably when the drive fluid is provided in a closed system or in a quasi-closed system. A quasi-closed system is one in which a small quantity of fluid is discharged in a controlled manner in order to provide lubrication. As an alternative, it is also possible to have a drive with drill piping.

A further solution of the invention provides for the drilling apparatus to be a drilling apparatus of an HDD drilling system or to be a feed unit. The drilling apparatus here is a comparatively small one which is easy to manouver or move and therefore does not involve any significant load during movement between the individual drilling sites.

A further solution of the invention provides for a mud circuit which can drive and/or steering the advancement head. A further solution of the invention provides for a steering element for horizontal or vertical steering. A further solution of the invention provides for a mud circuit, which can convey away from the borehole the soil loosened by the drilling-head system wherein preferably a jet pump is provided for transporting the soil away. A further solution of the invention provides for the drill piping to be of double-walled design and to be a constituent part of a drilling-fluid circuit, or the interior of the drill piping and the annular space between the casing and drill piping to be constituent parts of a drilling-fluid circuit.

A further solution of the invention provides for at least one discharging point for discharging drilling fluid in the form of lubrication. A further solution of the invention provides for the lubrication to be a stationary lubrication.

A further solution of the invention provides, in a second drilling run, for a reamer-drilling head to be capable of being connected to the drill piping and/or casing.

A further solution of the invention provides for the reamer-drilling head to be a hammer drill for displacing the soil, a soil-displacement screw, preferably with a drilling-tool drive for displacing the soil, or a drilling-head system made up of a drilling tool and drilling-tool drive for loosening the soil.

A further solution of the invention provides for a protective pipe to be capable of being introduced into the borehole, preferably during or before the operation of removing the drill piping and/or casing from the borehole, the underground cables or underground lines being introduced into said protective pipe.

A further solution of the invention provides for the protective pipe to be capable of being produced on site from a hose, made of flat material, preferably made of plastics material, or from pipe sections, preferably made of plastics material.

In respect of the method, the object according to the invention is achieved in that the soil is displaced or loosened and removed by the advancement head, and this results in an annular space between a borehole wall and the casing, the drill piping and/or a protective pipe and in that a lubrication is provided in the annular space.

A further solution of the invention provides for a drilling apparatus to transmit a feed motion to the drilling head via a casing.

A further solution of the invention provides, in the case of the soil being displaced, for the advancement head used to be a displacement drilling head, preferably a hammer drill or a soil-displacement screw, particularly preferably with a drilling-tool drive.

A further solution of the invention provides, in the case of the soil being loosened and removed, for the advancement head used to be a drilling-head system made up of a drilling tool and drilling-tool drive.

A further solution of the invention provides for a mud circuit for a mud medium, preferably bentonite, which drives and/or steers the advancement head and/or conveys away from the borehole the loosened soil, wherein the operations of feeding and discharging the mud medium in the mud circuit take place preferably via double-walled drill piping or via the interior of the drill piping and the annular space between the casing and drill piping.

The method according to the invention and the system according to the invention will be explained in more detail in the following text with reference to a preferred exemplary embodiment in conjunction with a drawing, in which:

FIGS. 1*a* to 1*c* shows a schematic illustration of the method according to the invention, and of the system according to the invention, with a hammer drill, FIGS. 2*a* to 2*c* shows an illustration analogous to FIGS. 1*a* to 1*c* with a displacement screw, FIGS. 3*a*, 3*b*, 4*a*, 4*b*, and 5 show schematic illustrations of displacement drilling heads, FIG. 5 shows a schematic illustration of a mud-based drilling head, FIGS. 6*a* to 6 *c* and 7*a* to 7*c* show a schematic illustration of the operation of drawing underground cables into the borehole, and FIGS. 8 to 18 show schematic illustrations of the operation of introducing a protective pipe into the borehole.

At a starting point 100, an HDD drilling apparatus 10 is installed (FIGS. 1*a* to 1 *c* and 2*a* to 2*c*) and connected to the advancement head 12 via drill piping 11. Also provided is a casing 14 which encloses the drill piping 11. With the aid of the torque provided by the drilling apparatus 10 and of the feed force the advancement head 12 is pushed along the predetermined route 101 in the direction of the target point 110.

The advancement head 12 illustrated and used in FIGS. 1*a* to 1*c* is a hammer drill 15. The feed operation takes place here via the casing 14. The drill piping 11 serves to feed mud for driving the hammer drill 15 and to rotate the hammer drill 15, for example for control purposes.

The advancement head 12 provided in FIGS. 2*a* to 2*c* is a displacement screw 16. The feed operation here takes place via the casing 14. The drill piping 11 serves to rotate the displacement screw 16. This can be controlled by mud being fed. As an alternative, it is also possible for the displacement screw 16 to be driven by a motor (not illustrated) provided in the advancement head 12. The feed of mud then serves to drive the motor.

Once the advancement head 12 has penetrated the surface at the target point 110 it is removed. The drill piping 11 is then connected, at the target point, to a protective pipe 20, for example made of plastics material, and is drawn in via the drilling apparatus 10 as the drill piping 11 and/or the casing 14 are/is being drawn back. The connection in FIGS. 2*a* to 2*c* is achieved via a connecting element 21.

As an alternative, it is also possible for the casing 14 to be pushed out of the borehole 102 by the protective pipe 20, for example made of polymer concrete or of a pressure-resistant plastics material, such as for example GFRP (glass-fibre reinforced plastic), by the protective pipe 20 being introduced into the borehole 102. There is no need here for the casings 14 to be connected to one another in a tensile-resistant manner.

It is possible, as shown in FIGS. 1*a* to 1*c*, for a reamer-drilling head 13 to be provided between the drill piping 11 and the protective pipe 20. As the protective pipe 20 is being drawn in, it is attached to the subsoil in a cavity-free manner for example by mortar, bentonite mud or liquid soil. The underground cables 30 are drawn in following completion of the protective pipework 31 or, if there is no protective pipework 31 provided, they are drawn directly into the borehole.

As an alternative, the starting point 100 and target point 110 may also be provided in the form of a starting trench and target trench (not illustrated).

FIG. 3*a* shows a schematic sectional view of a hammer drill 15 connected to drill piping 11 and a casing 14. The hammer drill 15 has a displacement head 41 at its front end. Said displacement head is connected to a hammer element 42 and is mounted in the drilling-head portion 43. The hammer drill 15 is also attached to the casing 14. The drill piping 11 feeds drilling mud 120 to the hammer element 42 in order to drive the latter. The asymmetrically configured displacement head 41 here transmits impact to the soil, and therefore the soil structure is loosened and the hammer drill 15 is moved onward in the borehole via the feed motion transmitted to it by the casing 14. Provided behind the drilling-head portion 43 are outlet nozzles 44, at which mud 120 is discharged into an annular space 121 so as to provide a lubrication in the annular space 121, this reducing the friction in respect of the casing. It is additionally possible for the casing 14 to provide lubricant outlets 45, via which mud 120 can likewise be discharged, in the form of relubrication, into the annular space 121.

FIG. 3*b* shows a reamer-drilling head 13. The latter is connected to the protective pipe 20 and to the casing 14, as well as to the drill piping 11, and is supplied with mud 120. The reamer-drilling head 13 here is provided with a hammer element 42, which acts in a manner analogous to the one described above. It is supplied with mud, for driving purposes, via the drill piping. The mud discharged from the hammer element 42 flows back to the drilling apparatus 10 via the casing 14 or via the interspace 17 between the casing 14 and drill piping 11. A rotating element, or also removal of soil via a drilling tool, would likewise be possible as an alternative.

FIG. 4*a* shows a schematic sectional view of a displacement screw 16, which is connected to drill piping 11 and a casing 14. At its front end, the displacement screw 16 has a rotation head 46, the rotation of which displaces the soil positioned against it. The displacement screw 16 is moved onwards in the borehole via the feed motion transmitted to it by the casing 14. The displacement screw 16 here has a control element 47, which is a hydraulic cylinder or the like, actuation of which can alter the direction by virtue of the front portion 48 being tilted.

FIG. 4*b* shows how a protective pipe 20, or the protective pipework 31, is connected to the casing 14 and the drill piping 11 via a connecting element 21 without a reamer-drilling head 13 being provided.

FIG. 5 shows a schematic sectional view of a drilling-head system 18 made up of a drilling tool 19 for loosening the soil positioned against it, a drilling-tool drive 22 for rotating the drilling tool 19, and a jet pump 23 for conveying away the mixture 123 made up of drilling fluid 120 and loosened soil. Outlet nozzles 44, 45 may also be provided here.

FIGS. 6*a* to 6*c* and 7*a* to 7*c* show, schematically, the operation of the underground cables 30 being drawn into the borehole, either into the protective pipework 31 (FIGS. 6*a* to 6*c*) or directly into the soil (FIGS. 7*a* to 7*c*).

FIGS. 6*a* and 7*a* shows the operation of creating the borehole using the advancement head 12, casing 14 and drill piping 11, as described above.

FIG. 6*b* illustrates the operation of drawing the protective pipework 31 into the borehole by virtue of the casing 14 and the drill piping 11, or only the casing 14, being pulled out or pushed out. Then, in FIG. 6*c*, the underground cables 30 are drawn in either by a traction cable (not illustrated), which has been introduced with the protective pipework 31, or via the drill piping 11, which remains in the borehole, while the protective pipework is being introduced into the borehole by virtue of the casing 14 being pulled or pushed out.

FIG. 7*b* shows the operation of drawing the underground cables 30 into the casing 14 by virtue of the drill piping 11 being pulled, or alternatively pushed out. FIG. 7*c* then illustrates how the casing 14 is then pulled out of the borehole once the underground cables 30 have been introduced.

FIGS. 8 to 18 show how the protective pipework is provided for laying purposes and how the underground cables can be introduced into the bore. The important factor here is that, for example in the case of current-carrying underground cables 30, there is adequate heat transmission ensured both when said cables are laid directly in the soil and when they are laid in protective pipework 31.

The operation of laying the cables directly in the soil is shown in FIGS. 8 and 18. The underground cables 30 are arranged, for example via spacers 32, to form an assembly that is drawn into the borehole 102. The underground cables are provided with a safeguard in the form of runners 33 (FIG. 8), which are designed in the form of half-shells. The borehole 102 is then filled with liquid soil or bentonite 34 or the like, in order to provide for adequate heat transmission. As an alternative to the runners 33, it is also possible to provide a safeguard in the form of a coating 35, which for example has already been applied to the cables at the factory.

If protective pipework 31 is introduced, the underground cables then being introduced into said pipework, the latter can be constructed in various ways.

FIG. 17 here shows that the protective pipework 31 is constructed from individual protective pipes 20 by the latter being butt-welded. The protective pipes 20 here are oriented axially, and the joints 24 are, if appropriate, planed and are heated by a heating element 25 and pressed against one another.

As an alternative, the protective pipework 31 can be produced on site from flat material. Appropriate equipment (not illustrated) is necessary for this purpose.

FIG. 9*a* shows protective pipework 31 formed by an open pipe 36 which is bent on site from a flat material 37 and introduced directly into the borehole 102. The cable assembly is then introduced into said protective pipework and the pipe is filled in the soil with liquid soil or bentonite 34 or the like. In the case of the protective pipe which is illustrated in FIG. 9*b*, the flat material is also additionally connected, for example by welding, adhesive bonding, plug-fitting, etc., to form a pipe. The production operation itself is illustrated schematically in FIG. 10. The spooled flat material 37 is bent over a die 36a and, if appropriate, connected.

Figure 11:
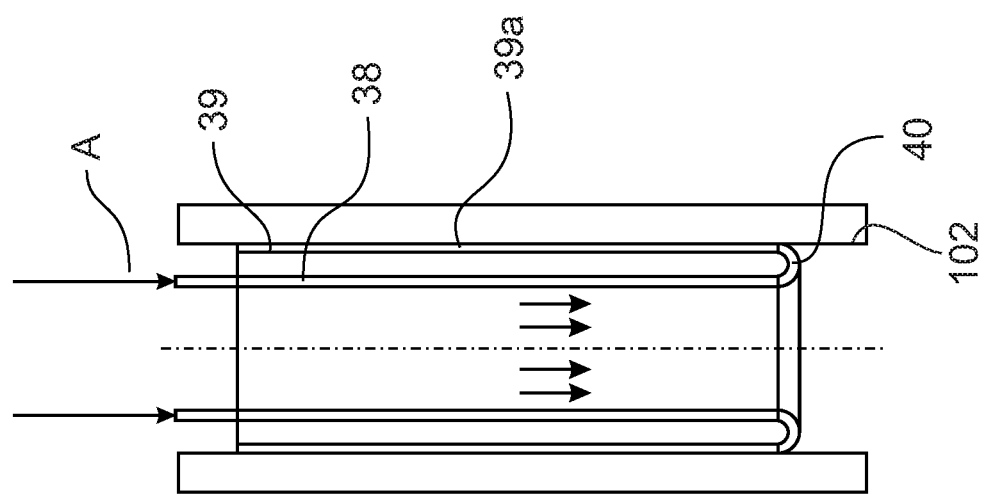

FIG. 11 shows a further variant. Here, a protective pipework 31 is produced by turning inside out. For example, a flat material 37, in particular made of plastics material, is used to produce a pipe 38, which is introduced into the borehole 102 by being pushed in in arrow direction A. The start 39 of the pipe 38 is fastened in an inside-out state to produce an outer pipe 39a that butts against the borehole 102. The inside-out zone 40 here travels into the borehole as a result of the inner pipe 38 being fed onward, and this results in pipework 31 being produced.

Figure 16:
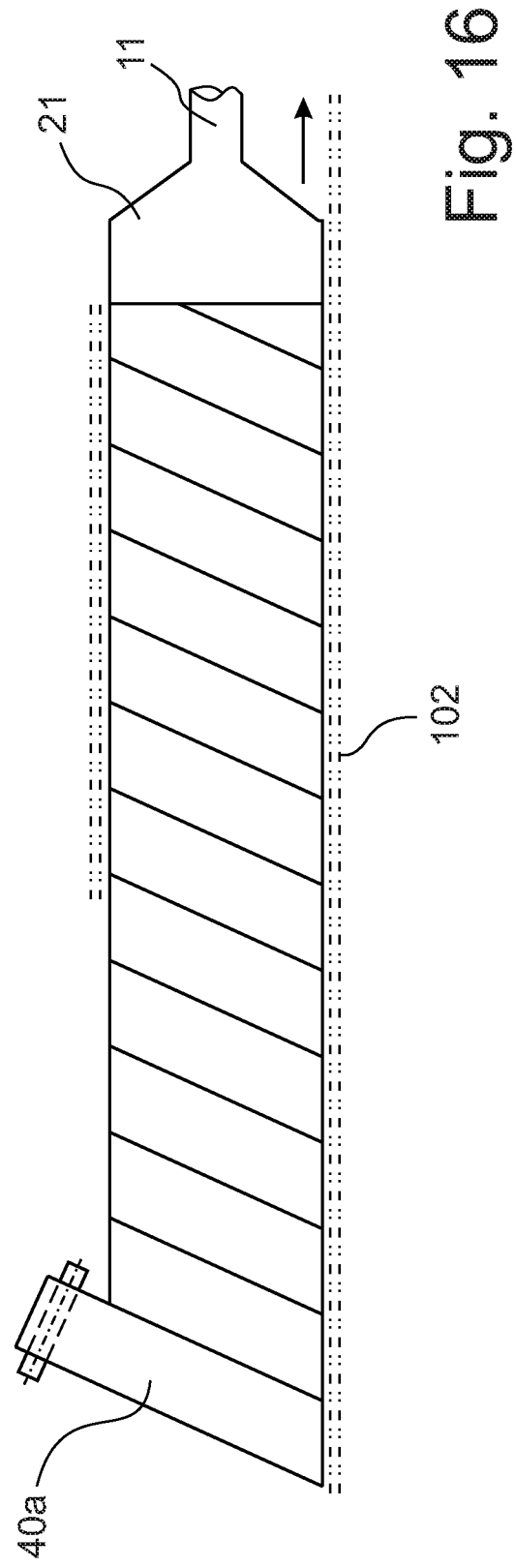

A further variant for on-site production of the protective pipework from flat material is shown in FIG. 16. Here, the protective pipework is welded together in helical form from strips 40a as it is being drawn into the borehole 102.

Figure 12:
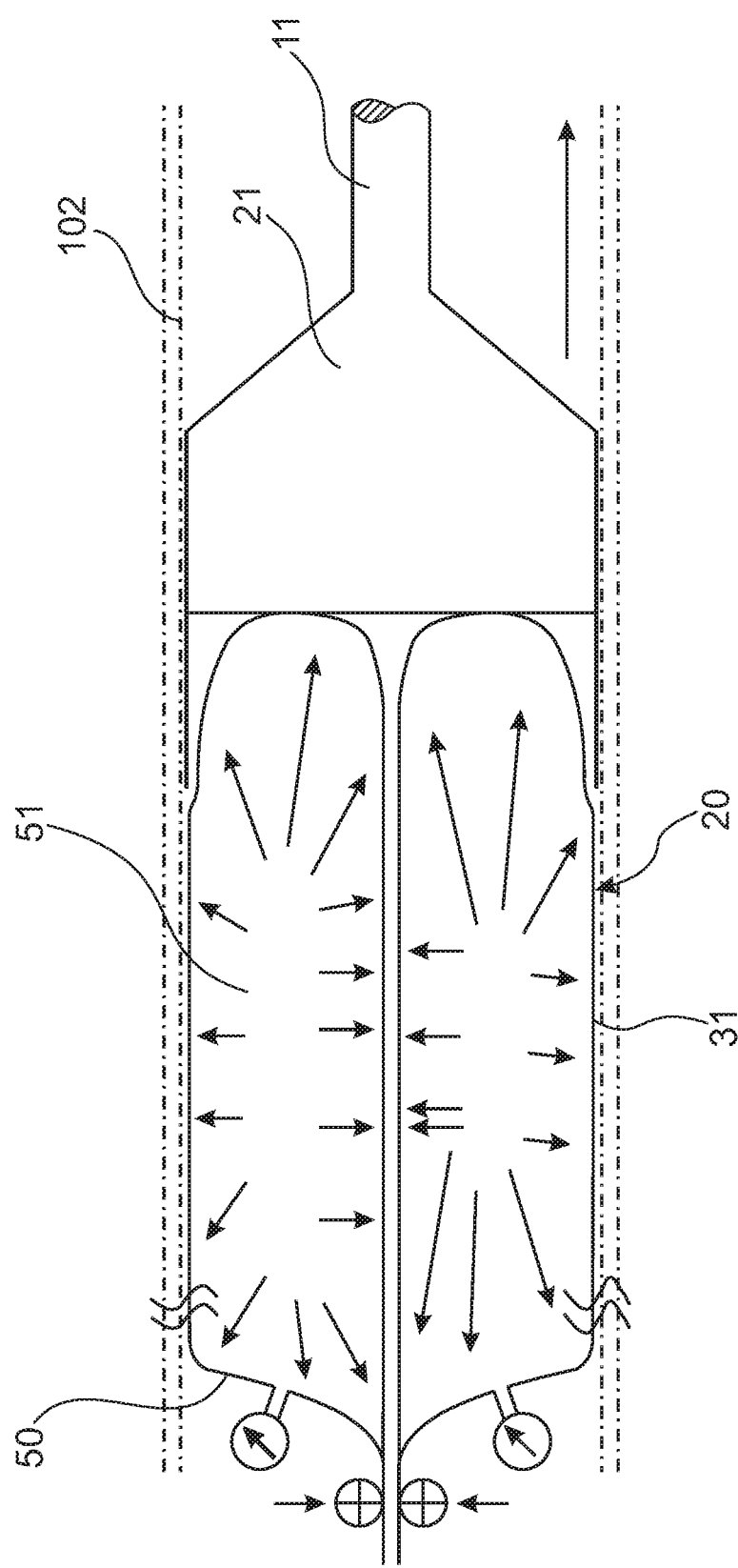

FIG. 12 shows the protective pipework 31 being produced from a hose. A plastics-material hose 50 impregnated, for example, with synthetic resin is fitted into the borehole 102. The folded-back hose 50 is filled with cold water 51, as a result of which the hose 50 draws itself into the borehole 102 and butts in a form-fitting manner against the borehole 102. The resin then cures in an exothermic reaction by the addition of hot water.

Figure 13:
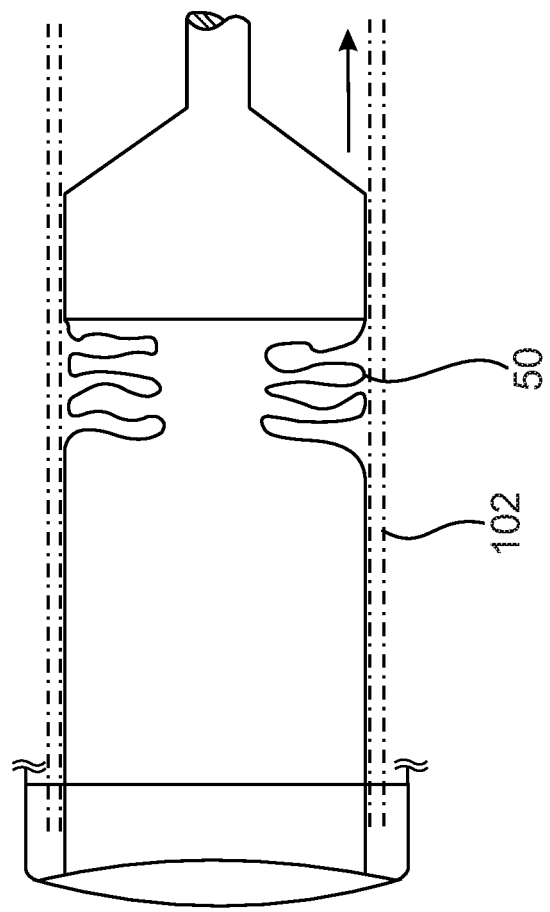

As an alternative to this, FIG. 13 shows an axially folded-together hose 50 which, as it is being drawn into the borehole, is held under tension at the beginning of the borehole 102 and then unfolds in the borehole to form the protective pipework. If appropriate, it is also necessary, as outlined above, for curing to be carried out.

Figure 14:
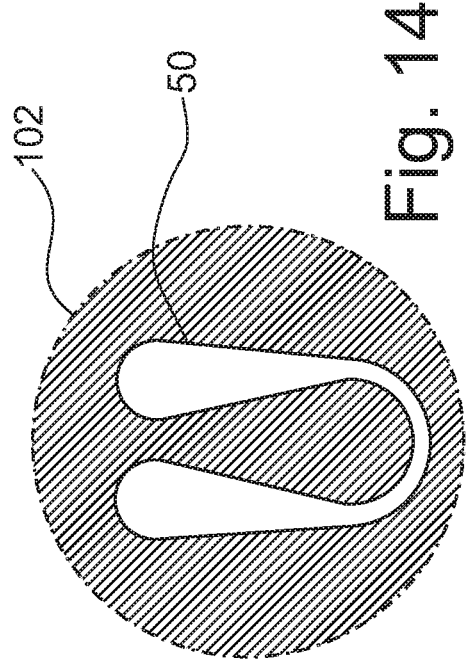
Figure 15:
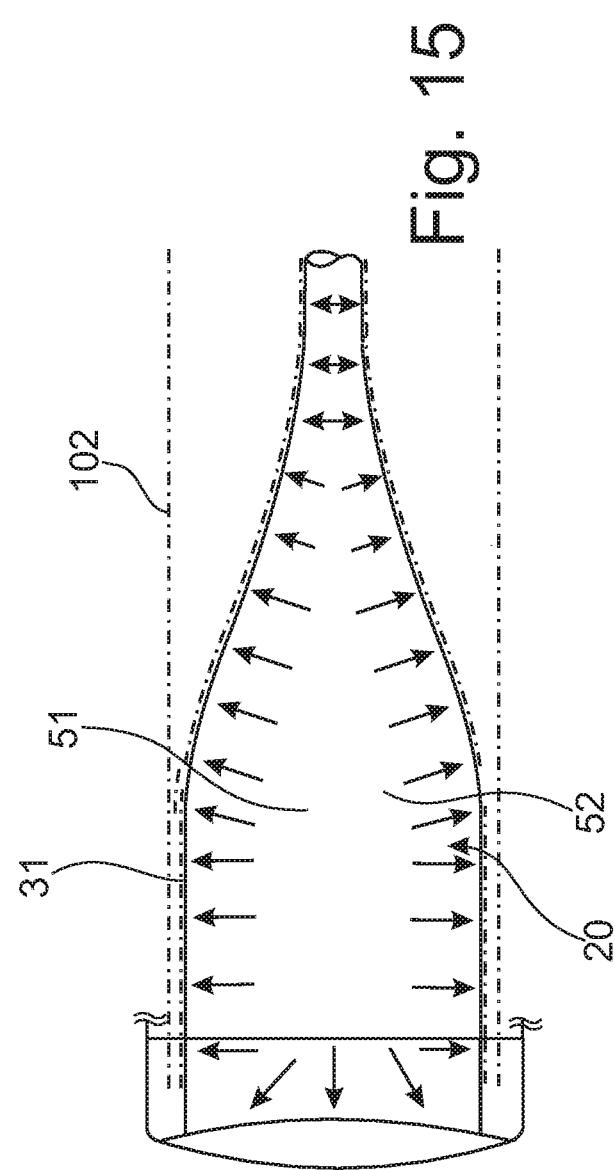

FIGS. 14 and 15 show a further possible way of introducing protective pipework. Here, a hose 50 that is folded in the radial direction is introduced into the borehole 102. The pipe is then subjected to pressure using water 51 or steam 52, so that it widens from its radially folded state onto the to form the protective pipework 31.

| List of reference signs | |
| --- | --- |
| 10 | HDD drilling apparatus |
| 11 | Drill piping |
| 12 | Advancement head |
| 13 | Reamer-drilling head |
| 14 | Casing |
| 15 | Hammer drill |
| 16 | Displacement screw |
| 17 | Interspace |
| 18 | Drilling-head system |
| 19 | Drilling tool |
| 20 | Protective pipe |
| 21 | Connecting element |
| 22 | Drilling-tool drive |
| 23 | Jet pump |
| 24 | Joint |
| 25 | Heating element |
| 30 | Underground cable |
| 31 | Protective pipework |
| 32 | Spacer |
| 33 | Runner |
| 34 | Bentonite |
| 35 | Coating |
| 36 | Pipe |
| 36a | Die |
| 37 | Flat material |
| 38 | Pipe |
| 39 | Start |
| 39a | Outer pipe |
| 40 | Inside-out zone |
| 40a | Strip |
| 41 | Displacement drilling head |
| 42 | Hammer element |
| 43 | Drilling-head portion |
| 44 | Outlet nozzle |
| 45 | Lubricant outlet |
| 46 | Rotation head |
| 47 | Control element |
| 50 | Plastics-material hose |
| 51 | Cold water |
| 52 | Steam |
| 100 | Starting point |
| 101 | Route |
| 102 | Borehole |
| 110 | Target point |
| 120 | Drilling mud |
| 121 | Annular space |
| 123 | Mixture |
| A | Arrow directions |

The invention claimed is:

1. A system for laying underground cables or underground lines in the ground near the surface, the cables or lines being laid in a borehole along a laying route between a starting point and a target point with a drilling apparatus, comprising;
 a drilling head comprising a drilling tool with a drilling tool drive, configured to loosen soil to create the borehole; and,
 at least one of drill piping or casing connected to the drilling head;
 a mud circuit connected to the drilling head with a jet pump, configured to convey away from the borehole the soil loosened by the drilling head inside at least one of the drill piping or the casing, wherein the jet pump is arranged in the drilling head;
 wherein a diameter of the drilling head is greater than a diameter of at least one of the piping or casing whereby an annular space is created between a borehole wall and the at least one of piping or casing, and the annular space is filled with a lubrication, and
 wherein the at least one of the drill piping or casing is removed from the borehole and at least one of the underground cables, the underground lines or a protective pipe containing the underground lines or cables is placed within the borehole while or before the drill piping or casing are removed.

2. The system as claimed in claim 1, wherein the drilling-tool drive is at least one of an electric motor or a mud motor or a piping drive.

3. The system as claimed in claim 1 comprising the mud circuit, configured to at least one of drive or steer the advancement head.

4. The system as claimed in claim 1 wherein the drill piping is at least one of double-walled design which is a constituent part of the mud circuit, or arranged with an interior of the drill piping and the annular space between the casing and drill piping as constituent parts of the mud circuit.

5. The system as claimed in claim 1 comprising at least one discharging point configured to discharge drilling lubrication fluid.

6. The system as claimed in claim 1 comprising a second drilling run comprising a reamer-drilling head connected to the at least one of drill piping or casing, wherein the reamer-drilling head is at least one of; a hammer drill configured to displace the soil, a soil-displacement screw with a drilling-tool drive configured to displace the soil, or a drilling-head system comprising a drilling tool and drilling-tool drive configured to loosen the soil.

7. The system as claimed in claim 1, wherein the protective pipe is produced on site out of at least one of a hose made of plastics material, or pipe sections made of plastics material.

8. A method for laying underground cables or underground lines in the ground near the surface, the cables or lines being laid in a borehole along a laying route between a starting point and a target point, comprising:
   moving a drilling head along the laying route
   transmitting at least one of a feed motion or a feed motion and a rotation via at least one of drill piping or casing;
   loosening and removing soil by the drilling head resulting in an annular space between a borehole wall and at least one of the casing or the drill piping, or a protective pipe; and,
   introducing a lubrication in the annular space wherein the at least one of the drill piping or casing is removed from the borehole and at least one of the underground cables, the underground lines or a protective pipe containing the underground lines or cables is placed within the borehole, while or before the drill piping or casing are removed;
   wherein as the drilling head is used a drilling-head system comprising a drilling tool and drilling-tool drive, wherein the soil loosened by the drilling head to conveyed away from the borehole inside at least one of the drill piping or the casing using a jet pump as part of the drilling head system.

9. The method as claimed in claim 8, wherein a mud circuit for a bentonite mud medium at least one of drives or steers the drilling head or conveys away the loosened soil from the borehole, wherein operations of feeding and discharging the mud medium in the mud circuit are at least one of via double-walled drill piping or via the an interior of the drill piping, or via the annular space between the casing and drill piping.

10. The method as claimed in claim 8, wherein operations of feeding and discharging a mud medium in a mud circuit are at least one of via double-walled drill piping or via an interior of the drill piping, or via the casing.

* * * * *